UNITED STATES PATENT OFFICE.

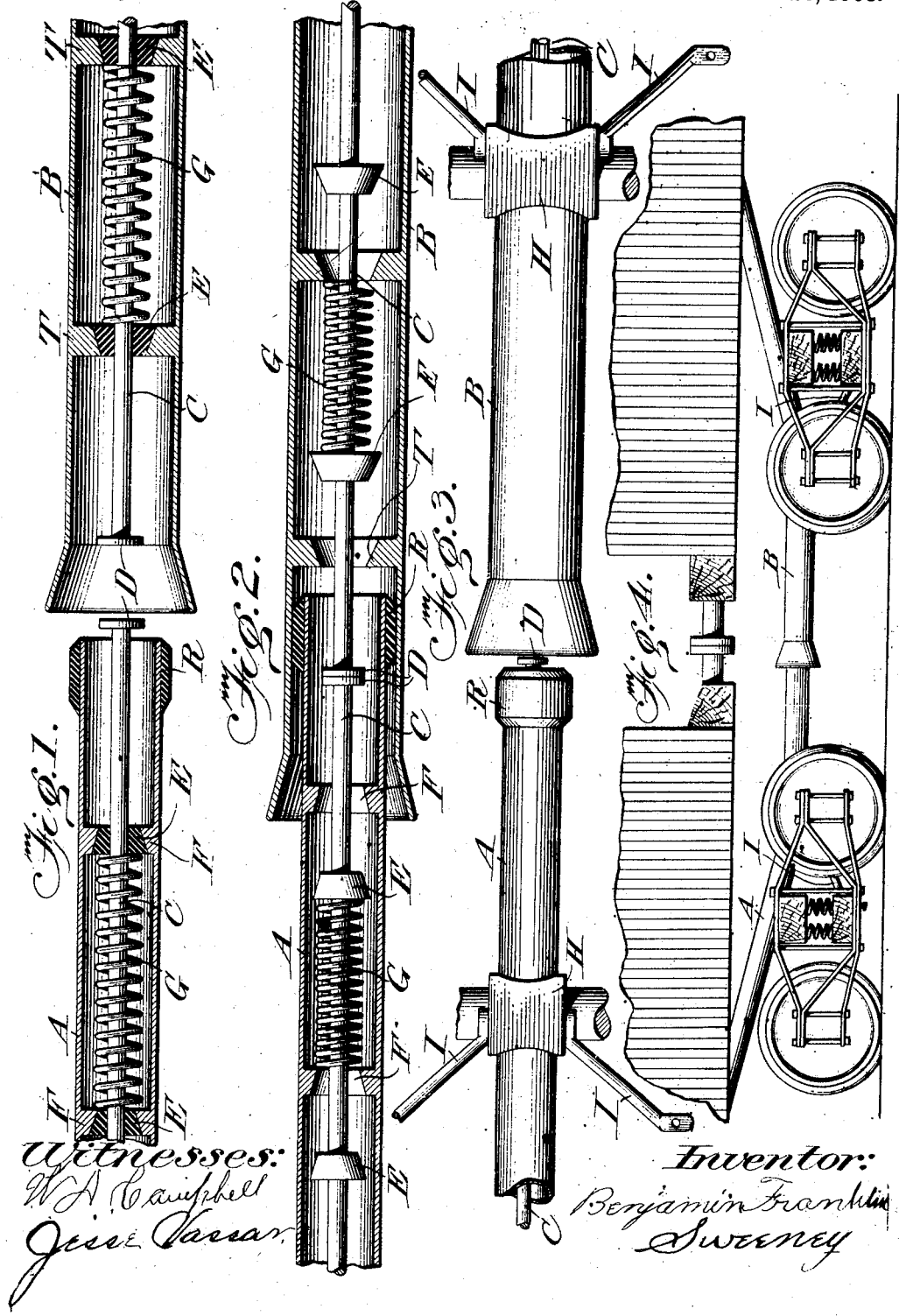

BENJAMIN FRANKLIN SWEENEY, OF NEOSHO, MISSOURI.

AIR SELF-COUPLING.

No. 901,660.     Specification of Letters Patent.     Patented Oct. 20, 1908.

Application filed October 10, 1907. Serial No. 396,844.

*To all whom it may concern:*

Be it known that I, BENJAMIN F. SWEENEY, a citizen of the United States, residing at Neosho, in the county of Newton and State of Missouri, have invented a new and useful Air Self-Coupling, of which the following is a specification.

This invention relates to new and useful improvements in automatic couplings for pneumatic pipes for train service and comprises various details of construction, combinations and arrangements of parts which will be hereinafter fully described and then specifically defined in the appended claims.

My invention is illustrated in the accompanying drawings, in which:—

Figure 1 is a longitudinal sectional view centrally through the pipes to be connected. Fig. 2 is a similar view showing the pipes connected together. Fig. 3 is a bottom plan view of the pipes disconnected, and Fig. 4 is a side elevation of portions of two cars showing the pipes connected together.

Reference now being had to the details of the drawings by letter, A and B designate two pipe sections, the former of which is provided with apertured partitions F, the wall of each partition being inclined, as shown clearly in the drawings, and C is a stem having mounted thereon flexible valves E which are apertured and adapted to conform to the inclined walls of the apertures in said partitions to cause an air-tight joint. A coiled spring G is interposed between each valve E and one of said partitions and serves to normally hold the two valves seated.

The pipe B, which is of larger diameter than the pipe A, has a flaring end adapted to receive the end of the pipe A, and R designates a flexible packing about the circumference of the telescoping end of the pipe A, said packing R being adapted to snugly contact with the inner surface of the tube B in order to cause an air-tight joint when the valves are unseated in the manner shown in Fig. 2. Said pipe B has a stem C similar to the stem mounted upon the pipe A and is also provided with the tapering valves E which are adapted to seat against the tapering margin of the walls of apertures in the partitions T. A spring G bears between one of said valves E and the tube B and a partition T serves to normally hold the valve seated. The outer ends of each stem is provided with a head D which, as one pipe telescopes within another, are adapted to contact with each other and cause the valves in both pipes to unseat, thus opening a through connection between the pipes.

It will be noted that, by the particular construction of coupling for pneumatic pipes as shown, the valves are automatically unseated as the pipes telescope within the other, and said valves are held unseated while the pipes are connected together and, when the pipes withdraw one from the other, the springs will normally seat the valves. It will be noted that the two pipes have slight movements one independent of the other by the packed end of the pipe A moving as a piston within the pipe B, if desired, and still hold the valves unseated.

What I claim to be new is:—

1. An automatic coupling for pneumatic train pipes comprising pipes of different diameters, one adapted to telescope within the other, a packing about the end pipe adapted to form a movable air-tight connection as it telescopes within the other pipe, apertured valve seats within the pipe, valve stems, one within each pipe, valves fixed to said stems, and springs for normally holding the valves seated, the outer ends of the valve stems being adapted to contact with each other as one pipe telescopes within the other, thereby causing the valves to unseat, as set forth.

2. A coupling for pneumatic train pipes comprising pipes one adapted to telescope within the other, a packing about one pipe and forming a piston within the other, valves within the pipes and adapted to be unseated as the one pipe telescopes within the other, apertured partitions within said pipes, spring-actuated valve stems mounted one within each pipe and valves fixed to said stems, the outer ends of the latter being adapted to contact with each other as one pipe telescopes within another thereby the valves may be unseated, as set forth.

BENJAMIN FRANKLIN SWEENEY.

Witnesses:
JOHN T. STURGIS,
ALLIE MARTIN.